United States Patent [19]
Itoh

[11] 4,077,204
[45] Mar. 7, 1978

[54] CONTROL SYSTEM FOR A GAS TURBINE ENGINE

[75] Inventor: Takane Itoh, Yokohama, Japan

[73] Assignee: Nissan Motor Company, Limited, Japan

[21] Appl. No.: 711,883

[22] Filed: Aug. 5, 1976

Related U.S. Application Data

[63] Continuation of Ser. No. 516,079, Oct. 18, 1974, abandoned.

[30] Foreign Application Priority Data

Oct. 23, 1973  Japan ............................... 48-119120

[51] Int. Cl.² .............................................. F02C 9/08
[52] U.S. Cl. ........................... 60/39.28 R; 60/39.28 T
[58] Field of Search ................... 60/39.28 R, 39.28 T

[56] References Cited

U.S. PATENT DOCUMENTS

| | | | |
|---|---|---|---|
| 3,045,426 | 7/1962 | Brahm | 60/39.28 R |
| 3,620,010 | 11/1971 | Davis | 60/39.28 R |
| 3,764,785 | 10/1973 | Harner | 60/39.28 R |
| 3,772,880 | 11/1973 | Kubota | 60/39.28 R |
| 3,834,158 | 9/1974 | Oppmann | 60/39.28 R |

*Primary Examiner*—Clarence R. Gordon

[57] ABSTRACT

In an acceleration control of a gas turbine engine having a feedback system in which the fuel flow is controlled by comparison of a selected engine speed and an actual engine speed, when the difference between the speeds exceeds a predetermined level the control is performed from the selected speed signal to a temperature limit signal and the fuel flow is controlled so that the actual engine temperature does not exceed the limit.

2 Claims, 1 Drawing Figure

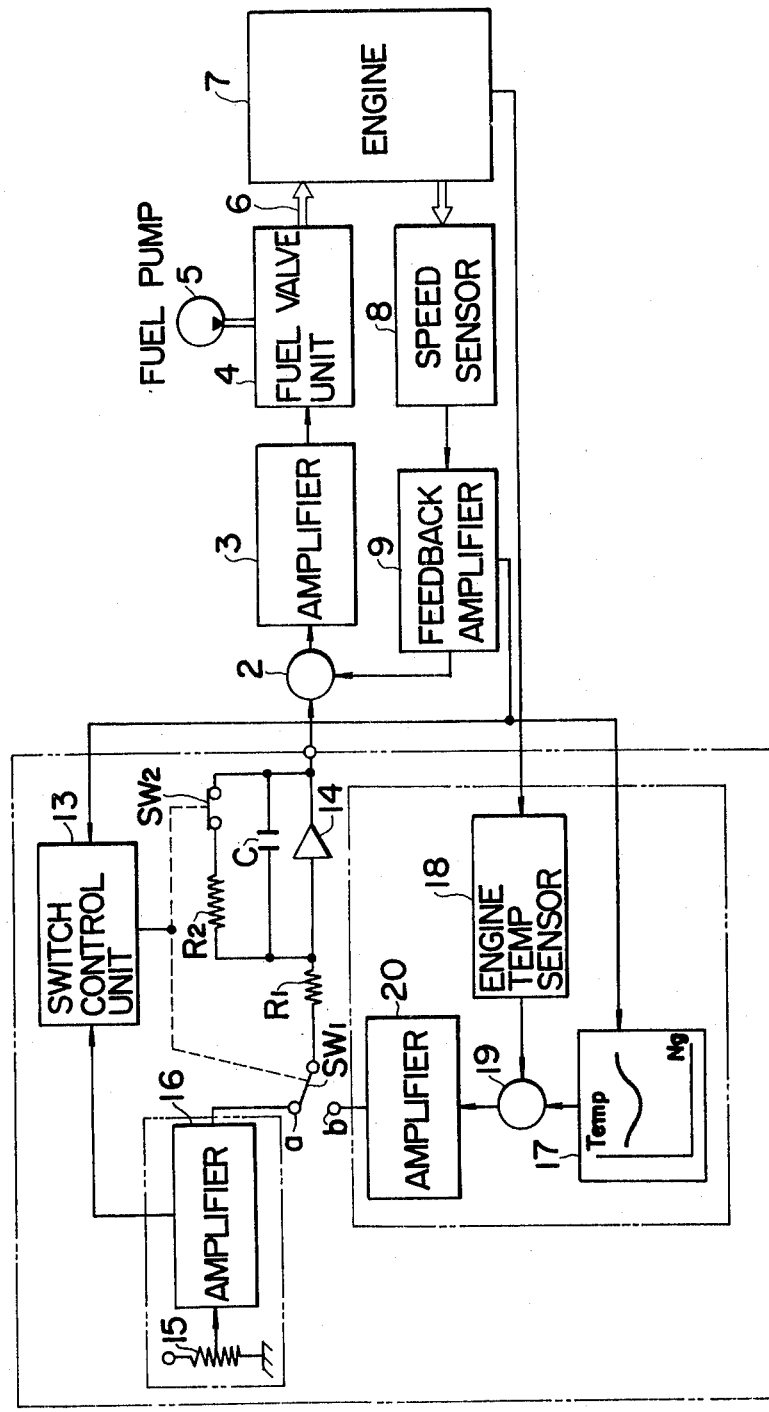

CONTROL SYSTEM FOR A GAS TURBINE ENGINE

This is a continuation, of application Ser. No. 516,079, filed Oct. 18, 1974, now abandoned.

This invention relates to a gas turbine engine, particularly to a system for controlling the fuel flow to the gas turbine engine.

In a conventional gas turbine engine a selected engine speed is compared with an actual speed and a speed error signal which represents the difference between the selected and actual engine speed is transmitted to a fuel valve controller. Receiving the speed error signal, the fuel valve controller adjusts the fuel valve to the proper setting to either raise the amount of fuel supplied to the engine to increase the engine speed, or to lower the amount of fuel to decrease the speed.

It has been found that if fuel flow is increased at too high a rate so-called surging phenomenon occurs. Such simple prior art feedback system as briefly described above cannot completely solve this problem.

Moreover the fuel flow is allowed to increase depending upon the position of an engine speed selection lever or an accelerator pedal without any limit regardless of the engine condition. This can result in the destruction of the engine due to overheating.

Therefore an object of the present invention is to provide a control system for a gas turbine engine in which the fuel flow is controlled by engine temperature so as to prevent the engine from overheating.

Another object of the invention is to provide a control system in which the fuel flow is controlled by both engine speed and engine temperature.

Still another object is to present a new control system which automatically adjusts engine speed to maintain engine operation in a safe manner.

A further object of the invention is to present a control system in which an increase in engine speed is regulated within a limit to prevent surging and thermal destruction of the engine.

The FIGURE shows a schematic diagram of a control system of the invention. The control system description of the preferred embodiment of the present invention has a temperature limit signal generator and a switching means.

When a selected engine speed is too much higher than an actual engine speed the switching means switches from the selected speed signal to the temperature limit signal as a controlling signal, thus limiting the fuel flow, and therefore the engine speed increase within a safe range.

Referring to the FIGURE, ther is shown a control system for the gas turbine engine a part of which is similar to that of the prior art. A selected speed signal generator 15, which may be of a potentiometer associated with a speed selector lever or an accelerator pedal (not shown), produces a selected speed signal according to the accelerator pedal position.

Assuming that a switch SW1 is in contact with a terminal $a$ as it normally is, the selected speed signal from the generator 15 is transmitted through an amplifier 16, the first switch SW1, a resistance R1 and an operational amplifier 14 to a subtractor 2.

The actual engine speed of the gas turbine engine 7 is detected by a speed sensor 8 and the actual speed signal is transmitted from the sensor 8 through a feedback amplifier 9 to the subtractor 2.

Receiving the selected speed signal and the actual speed signal the subtractor 2 produces a speed error signal which corresponds to the difference between the selected speed and the actual engine speed.

The speed error signal is transmitted through an amplifier 3 to a fuel valve unit 4 which is provided in a fuel-supply line 6 between a fuel pump 5 and the engine 7. The fuel valve unit 4, receiving the speed error signal, adjusts the fuel valve setting to allow an appropriate fuel flow into the engine 7 to attain the selected speed, thus making the engine speed follow up to the selected speed. This part of the system, as described above, is similar to the conventional system.

A temperature limit signal generator 17 produces a temperature limit signal which represents the temperature at which the engine is operated most effectively or safely, such as the maximum allowable temperature. The temperature limit signal from the generator 17 is transmitted to a substractor 19, and an actual temperature signal from an engine temperature sensor 18, which detects the actual engine temperature, is also transmitted to the subtractor 19.

The generator 17 may have a memory for storing therein the temperature limit as a function of the engine speed.

Receiving the actual engine speed signal through the feedback amplifier 9, the generator 17 produces a temperature limit signal for that actual speed.

The subtractor 19 produces an allowance signal which corresponds to the difference between the temperature limit and the actual temperature, which allowance signal is transmitted to a terminal $b$ through an amplifier 20. In parallel with the operational amplifier 14 there are provided a capacitor C and a resistance R2 which are also in parallel with each other.

A normally closed switch SW2 is provided in series with the resistance R2.

A switch control unit 13 is associated with the switches SW1 and SW2 to activate or deactivate them simultaneously.

This switch control unit 13 receives the selected speed signal through the amplifier 16 and the actual speed signal through the feedback amplifier 9. The switch control unit 13 compares the two signals and when the difference between the selected speed and actual speed exceeds a predetermined level the unit 13 activates the switches, causing the switch SW1 to contact the terminal $b$ and the switch SW2 to open. The predetermined level at which the control unit 13 changes the condition of the switches SW1 and SW2 may be regulated in accordance with the allowance signal, if desired.

According to the control system of the invention, during a normal gradual acceleration the selected speed signal caused by the unshown accelerator pedal positioning is sent to the subtractor 2 through the associated elements and a comparison with the actual speed is made. Then the fuel valve adjustment is made according to the speed error signal so as to permit fuel flow increase.

Since the actual speed of the gas turbine does not respond to the change of the demanded speed instantly the difference between the selected speed signal and the actual speed signal checked in the switch control unit 13 shows the degree of acceleration.

Therefore if a high rate of acceleration is intended the difference between two signals is large, and when the difference exceeds the predetermined level the switch control unit 13 changes the contact of the switch SW1 from the terminal *a* to the terminal *b* and causes the switch SW2 to open, thus switching the input of the subtractor 2 from the selected speed signal to the allowance signal appearing at the terminal *b*.

Now, since the switch SW2 is held open, the allowance signal is processed through the integrator circuit formed of the resistance R1 and the capacitor C, then is sent to the subtractor 2, thus controlling the fuel flow.

It is understood from the description above that the switching level at the switch control unit 13 is determined to correspond to the acceleration level over which it is difficult to maintain engine operation safety.

When the difference between the temperature limit and the actual temperature is large there is no danger of surging or thermal destruction, therefore the allowance becomes large and the fuel flow is allowed to increase rather rapidly. On the contrary when the actual engine temperature is close to the limit the allowance becomes small and increasing speed of the fuel flow is restricted.

Thus the acceleration is accomplished without any danger of surging or thermal destruction. When the actual speed, being increased, comes close to the selected speed and the difference between them comes down below the aforementioned level, the switch control unit 13 deactivates the switches to the normal positions and thereafter the fuel flow is controlled by the selected speed signal again.

According to the field of use of the engine the temperature limit signal generator 17 may be made to produce a fixed limit signal based on a condition for preventing engine surging or thermal destruction instead of the signal functional to the engine speed.

What is claimed is:

1. In a control system for a gas turbine engine which includes a fuel supply controller for controlling fuel supply to said turbine engine in accordance with difference between a selected speed signal and a feedback signal representing the actual engine speed of said turbine engine, the improvement comprising:
   a selected speed signal generator for producing said selected speed signal in accordance with the position of an engine speed control means;
   an allowance signal generator for producing an allowance signal representing the difference between a predetermined temperature limit and an actual engine temperature; and
   switch means connected to said selected speed signal generator and said allowance signal generator, for passing therethrough only said selected speed signal to said fuel supply controller when the difference between said selected speed signal and said feedback signal falls below a predetermined level and only said allowance signal when said difference between said selected speed signal and said feedback signal exceeds said predetermined level, said switch means including a switch circuit for passing therethrough said selected speed signal when it is de-energized and said allowance signal when it is energized, an operational amplifier connected between said switch circuit and said fuel supply controller, a capacitor bypassing said operational amplifier, and a series connection of a resistor and a normally-closed switch, said series connection bypassing said operational amplifier and said normally-closed switch being open when actuated, and a switch control unit for energizing said switch circuit and actuating said normally-closed switch when said difference between said selected speed signal and said feedback signal exceeds said predetermined level.

2. A control system as defined in claim 1, wherein said allowance signal generator receives a signal representing said predetermined temperature limit from a temperature limit signal generator having a memory in which said predetermined temperature limit is stored as a function of engine speed and produces said signal as a function of said actual engine speed.

* * * * *